Sept. 16, 1969 K. E. VOGEL 3,467,573
UPFLOW DIGESTER CONTAINING MEANS FOR SEPARATE REMOVAL
OF WASH LIQUOR AND PULPING LIQUOR AND METHOD
OF PULPING IN SAID DIGESTER
Filed Dec. 13, 1965
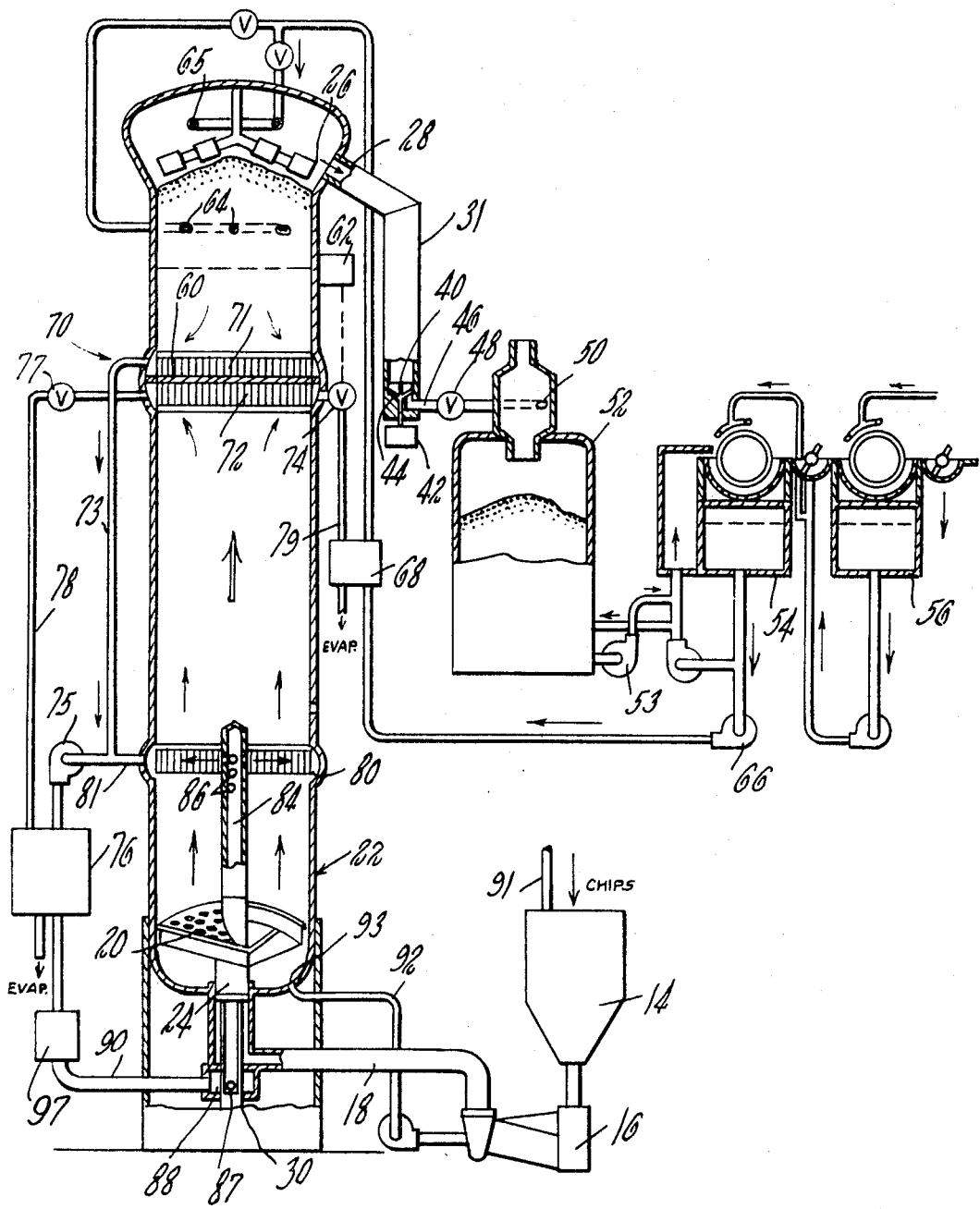

United States Patent Office 3,467,573
Patented Sept. 16, 1969

3,467,573
UPFLOW DIGESTER CONTAINING MEANS FOR SEPARATE REMOVAL OF WASH LIQUOR AND PULPING LIQUOR AND METHOD OF PULPING IN SAID DIGESTER
Karl E. Vogel, McKean, Pa., assignor to Improved Machinery Inc., Nashua, N.H., a corporation of Delaware
Filed Dec. 13, 1965, Ser. No. 513,186
Int. Cl. D21c 3/26, 7/00
U.S. Cl. 162—19                                  5 Claims

ABSTRACT OF THE DISCLOSURE

A continuous digester of the upflow type having a countercurrent washing zone at the upper end of the digester vessel, with the reaction zone positioned therebelow and with the interface between the two zones being maintained between two closely vertically spaced strainers for separate removal of the spent liquor and wash liquid, the latter being reintroduced into the vessel at its lower infeed end.

---

This invention relates to the continuous digesting of fibrous materials, such as wood chips, and more particularly to novel apparatus and methods for washing such materials following the chemical treatment thereof. More specifically, the apparatus of the present invention represents an improvement over the apparatus of Patent No. 3,061,007.

That earlier patent describes and claims an upflow digester of the type shown in Patent No. 2,878,116 but including a countercurrent washing zone at the upper end of the digester vessel, with the reaction zone positioned therebelow, the interface between the two zones being defined by a strainer through which wash and cooking liquor are removed to the usual evaporators. Although such apparatus is entirely satisfactory from the standpoint of wood chip treatment, it leaves something to be desired from the standpoint of efficient operation, in that the wash liquor is not utilized to the fullest extent possible, but rather is passed directly to the evaporators as a spent liquor diluent, reducing evaporator efficiency as well.

Accordingly, it is a major object of the present invention to utilize the wash liquor in a more efficient manner, and to avoid its direct dilution of the spent liquor passed to the evaporators. This is accomplished preferably by both substantially density differences between and substantially independent removal of the wash liquor and spent liquor, with the removed wash liquor being reintroduced into the vessel adjacent the lower infeed end thereof and the spent liquor being passed undiluted to the evaporators.

It is another object of the invention to utilize the wash liquor for heating in a highly efficient manner, this being accomplished by heating it and thereafter introducing it into the digester from openings in a centrally located inlet pipe spaced above the lower inlet end of the digester, preferably adjacent a lower recirculating strainer.

For the purpose of fully explaining preferred embodiments of the invention, reference is now made to the following specification, taken together with the accompanying diagrammatic drawing in side elevation of preferred apparatus according to the invention.

Referring to the drawing, the pressurized vessel 22 therein shown is generally similar to that shown in U.S. Patent No. 2,878,116, issued Mar. 17, 1959, but further includes according to the showing of Patent No. 3,061,007, issued Oct. 30, 1962, a washing liquid inlet, a liquid outlet strainer positioned well below the inlet and the vessel discharge, and means for controlling the liquid level to a point well below the discharge level and above the strainer, thus preferably providing four zones within the vessel, a heating and impregnation zone, a pulping or cooking zone, a submerged countercurrent diffusion washing zone thereabove and an uppermost drainage zone. In general, the apparatus includes a generally cylindrical upright elongated pressure vessel 22 of generally uniform cross-sectional area having a bottom opening 18 connected to wood chip infeed pump 16 connected to a chip storage vessel 14 and a top discharge mechanism connected to a suitable pulp storage tank. The advancing means includes a foraminous helical plate means mounted for rotational and reciprocatory movement through a limited distance relatively to the length of the vessel within the reaction vessel 22 near the lower end thereof by means of a shaft 30 extending vertically through the bottom of said vessel generally axially thereof. More specifically, said foraminous helical plate means comprises a single turn helical plate 20 having therein a plurality of perforations sufficient in number to allow substantially free passage of liquid therethrough but of small enough size to prevent passage of the chips or other fibrous material. Furthermore, the step of such helical surface is closed by a flat plate extending vertically between its upper and lower edges, and the peripheral edge thereof is positioned closely adjacent the inner walls of the reaction vessel 22 so that passage of chips into the bottom portion of said reaction vessel 22 may be prevented.

For feeding the pressurized mixture of chips and liquid to the upper surface of said plate, a tubular member 24 having its inner wall concentric with and spaced from shaft 30 is mounted on the lower surface of said helical plate extending downwardly therefrom, thus providing a central aperture between the upper and lower radial edges of said helical plate. The lower end of shaft 30 extends into a hydraulic cylinder (not shown) mounted beneath the lower end of reaction vessel 22 and forms the piston thereof, said cylinder being connected to a suitable source of fluid pressure to raise said shaft with the helical plate to reciprocate said plate, the force of the vessel pressure against the area of the upper end of said shaft being great enough rapidly to lower the plate when the pressure in the cylinder is exhausted, the pressure vessel 22 in such circumstances acting as an accumulator to provide the necessary force at a rapid rate.

The top discharge mechanism comprises scraper 26 located near the top of the vessel adapted to remove digested wood chips therefrom and so define the upper end of the mass of chips within vessel 22, as well as to define the upper end of the chip drainage zone. Scraper 26 moves the chips through housing 28, and discharges the chips to a vertical chamber 31. In the bottom zone of this chamber an upward facing, bladed agitator 40 is rotatably mounted and operatively connected with a driving means 42. A chamber bottom surface 44 generally conforms with the path of the lower edge of the rotatable blades, to define the lower extremity of the bottom zone. At least one orifice 46 is positioned in the bottom zone of the chamber in the bottom surface 44 below the path of the bladed agitator 40 so that rotation of the bladed agitator causes each blade to wipe by the inlet to the orifice, preventing clogging. A gate valve assembly 48 is positioned in the orifice 46 for adjusting and closing its aperture, and, if desired, means may be provided for diluting pulp in the bottom zone in which agitator 40 operates. Such agitator and associated structure being fully shown and described in Patent No. 3,206,356 need not herein be further described.

From the gate valve 48 the cooked and partially washed wood chips are discharged to atmospheric pressure for storage by means of a cyclone device 50 mounted on a suitable pulp storage tank 52 having discharge means. Such apparatus is well known in the art, the cyclone device having a tangentially directed inlet opening into a cylindrical compartment which operates to reduce the velocity of the pulp emerging from valve 48 and to separate it from the steam with which it is entrained, which pulp then drops into a pulp storage tank having suitable dilution and discharge means such as is shown in Patent No. 2,745,274, for example.

From the pulp storage tank 52, the pulp is passed by means of a suitable pump 53, to the first washer, generally designated 54, of a series thereof, herein shown as washers 54 and 56 although more may be employed depending upon the degree of washing desired. Such washers and their interconnections may be, for example, such as is shown in Patent No. 2,745,274, wherein countercurrent washing is carried out by utilizing the filtrate from a succeeding washer as the washing liquid for a preceding washer.

According to the present invention, an upper strainer 70 is provided spaced downwardly from the top of the vessel below the discharge opening 28 of the vessel for removal of liquid therefrom and to establish an interface between the top of the pulping or cooking zone and the bottom of the submerged washing zone thereabove, such strainer preferably having two separated superposed sections, upper section 71 and lower section 72 separated by horizontal wall 60. Said upper section is connected through pipe 73 to a central hollow injection tube 84 mounted on plate 20 and having fluid openings 86 spaced a substantial distance thereabove, said fluid openings being connected through tube 84 to lower the opening 87 within chamber 88. Pipe 90 is connected to chamber 88 for introducing thereinto wash water from pipe 73. A pump 75 and heat exchanger 76 and steam heater 97 are provided in such circuit for heating and pressurizing the wash water for injection through openings 86. A white liquor inlet 91 is connected to chip storage vessel 14.

The strainer section 72 is connected to pass liquor to the evaporators, not shown, through valves 74 and 77 and their associated pipes 78 and 79, such pipes being connected to heat exchangers 68 and 76 for heating, respectively, the wash liquor to the digester vessel and that being passed to the injection tube 84 therein. A liquid level sensing device 62 may be suitably located to sense and establish as hereinafter set forth a liquid level above the upper strainer and below the discharge opening 28. In addition, a series of wash liquid inlet openings 64 peripherally spaced in a horizontal plane around the vessel generally midway between the strainer 60 and discharge opening 28 are provided, preferably adjacent to the top of the submerged washing zone and bottom of the drainage zone defined by the level sensing device 62. If desired, a wash liquid shower distribution pipe 65 is provided above scraper 26.

In accordance with another aspect of the invention, another strainer 80 generally opposite to the central hollow injection tube openings 86 is provided between strainer 60 and plate 20, such being connected by pipe 81 to pipe 73 for circulation of liquor through heat exchanger 76 and steam heater 97 for reintroduction at hollow injection tube openings 86.

If desired, a pipe 92 may be provided for recirculating liquor from an access opening 93 beneath plate 20 to chip infeed pump 16.

Four zones are thus defined within vessel 22: a heating and impregnation zone below the lower strainer 80, a pulping or cooking zone below the lower section 72 of the upper strainer 70 and above the lower strainer 80, a submerged washing zone above the upper section 71 of the upper strainer 70; and an uppermost drainage zone. Means, such as a pump 66, are provided for feeding a supply of sufficiently pressurized wash liquid to openings 64 or to shower 65, and a heat exchanger 68 is provided for heating such liquid as may be required. With this arrangement, the treated chips, as they are moved above strainer 70, will be subjected to a countercurrent flow of heated wash liquid throughout the submerged washing zone between said strainer and the liquid level on vessel 22 defined by sensor 62. After moving above such level, they will be drained of the washing liquid and at the same time may be subjected to a flow of washing liquid from shower 65 for further washing. The liquid level may be controlled, for example, by adjusting strainer valve 74 in accordance with sensed level changes of device 62, although other level control means could also be employed.

At the lower end of the washing zone, as defined by strainer 70, the washing liquor is substantially removed by upper strainer portion 71 and is reintroduced, after being heated by heat exchanger 76, into injection tube 84, as is also the liquor recirculated through strainer 80. Thus, the wash liquor, by reason of the invention, provides the major portion of the necessary diluting liquor fed to the digester.

The spent black liquor is removed, substantially undiluted, at lower strainer section 72, and, after being passed through heat exchangers 68 and 76 to extract heat therefrom is passed to the evaporators.

If the washing of the treated chips within the pressurized vessel is to be followed by further washing in one or more cylindrical drum washers, then it is desirable that countercurrent washing be utilized throughout the system. Thus, if two washers be used as is shown in the drawings, they may be of a type with interconnections such as is shown and described in Patent No. 2,745,712. However, with the structure of the present invention arranged to precede such as series of washers, the washer liquid supplied to the wash liquid inlets of vessel 22 is taken from the filtrate of the next succeeding filter 54, the countercurrent flow of washing liquid through the series of filters 54, 56 being continued by the countercurrent flow of washing liquid through the washing zone within the reaction vessel.

It should be noted, however, that for successful operation of an upflow reaction vessel of the type described, wherein a countercurrent washing zone is superimposed above a cooking zone, it is necessary that the density of the liquid introduced into the upper zone, the washing zone, be less than that of the liquid below in order to keep the zones stable. Otherwise, the liquid in the upper zone will move downwardly, reducing the efficiency of the washing. This difference in density of the liquids may be achieved according to the invention by controlling two factors, concentration and temperature. More specifically, because the flow of washing liquid in the system is countercurrent through washers 56 and 54 and then through the washing zone of vessel 22, the concentration of dissolved organic solids in the liquid is greatest just below strainer 60 and less at inlets 64 and 65 thus producing the desired decrease in density throughout the washing zone. In addition, the temperature of the wash liquid leaving washer 54 is raised by means of heat exchanger 68 to approximately that of the cooking liquid, further decreasing the density of the wash liquid. It is convenient to heat the wash liquid as it passes through heat exchanger 68 by using the hot liquor from valve 74, thus eliminating the necessity of supplying steam at this point. The combined effects of concentration and temperature reduce the density of the wash liquid well beow that of the cooking liquid even if the wash liquid temperature is somewhat less. Thus, there will be little mixing so that the submerged washing zone will be highly effective.

What is claimed is:

1. In apparatus for the continuous pulping and washing of wood chips and a washing zone in the upper end portion thereof containing a washing liquid having a density substantially less than that of the pulping liquid, comprising a generally upright elongated reaction vessel wood chip advancing means in said vessel to advance the mass of said wood chips progressively upwardly through said zones wood chip discharge means in said vessel adjacent the upper end of said vessel washing liquid inlet means in said vessel adjacent the upper end of said vessel for feeding washing liquid downwardly through a washing zone and pulping liquid inlet means in said vessel positioned below said washing liquid inlet means for feeding pulping liquid upwardly through a pulping zone that improvement which consists of:

strainer means in said vessel spaced between said washing liquid inlet means and said pulping liquid inlet means, said strainer means having vertically spaced upper and lower liquid outlets establishing an interface between said washing liquid and said treating liquid for substantially separate removal of washing liquid and treating liquid from said vessel with said treating liquid being removed at the lower of said outlets and said washing liquid at the upper of said outlets and injecting means connected to said upper of said outlets of said strainer means and to said reaction vessel adjacent the lower end thereof for injecting a substantial proportion of said washing liquid removed by said strainer means through said upper liquid outlet directly into said reaction vessel adjacent the lower end thereof.

2. Apparatus as claimed in claim 1 wherein said injecting means includes means defining a centrally positioned outlet within said vessel spaced from the ends thereof a substantial distance below said strainer means.

3. Apparatus as claimed in claim 3 further including lower strainer means in said vessel adjacent said centrally positioned outlet means and said injecting means being connected to said lower strainer means for injecting a substantial proportion of the liquid removed from said lower strainer means directly into said vessel adjacent the lower end thereof.

4. A method for the continuous digesting and washing treatment of the wood chip component of a wood chip-liquid mixture successively to treat said wood chip component with a chemical reagent in a treatment zone followed by washing in a superposed washing zone within an upflow digester vessel comprising continuously maintaining a generally upright elongated compacted uniform mass of said wood chips of substantially uniform cross sectional area throughout its length by progressively feeding said wood chips to the lower end of said mass progressively advancing said wood chips upwardly throughout the length of said mass and continuously discharging the treated wood chips from the upper end of said mass simultaneously treating the same in a plurality of superposed zones including a pulping zone and a superposed washing zone by introducing a chemical pulping reagent to said pulping zone at a point spaced below the upper end thereof removing a major portion of said pulping reagent adjacent the upper end of said pulping zone, causing upward flow of said reagent in the upper end portion of said treating zone introducing washing liquid having a density substantially less than that of said pulping reagent at the upper end of said washing zone removing a major portion of said washing liquid substantially free of said pulping reagent adjacent the lower end of said washing zone, causing downward flow of said washing liquid in said washing zone and reintroducing a major portion of said removed washing liquid substantially free of said treating reagent at a location within the column adjacent the lower end of said pulping zone.

5. A method for the continuous digesting and washing treatment of the wood chip component of a wood chip-liquid mixture successively to treat said wood chip component with a chemical reagent in a treatment zone followed by washing in a superposed washing zone and drainage in an uppermost drainage zone within an upflow digester vessel comprising continuously maintaining a generally upright elongated compacted uniform mass of said wood chips of substantially uniform cross sectional area throughout its length by progressively feeding said wood chips to the lower end of said mass progressively advancing said wood chips upwardly throughout the length of said mass and continuously discharging the treated wood chips from the upper end of said mass simultaneously treating the same in a plurality of superposed zones including a submerged pulping zone a submerged superposed washing zone and an uppermost drainage zone out of submergence by introducing a chemical pulping reagent to said pulping zone at a point spaced below the upper end thereof removing a major portion of said pulping reagent adjacent the upper end of said pulping zone, causing upward flow of said reagent in the upper end portion of said pulping zone introducing washing liquid having a density substantially less than that of said treating reagent at the upper end of said washing zone removing a major portion of said washing liquid substantially free of said pulping reagent adjacent the lower end of said washing zone, causing downward flow of said washing liquid in said washing zone without substantial flow of liquid with said discharged wood chips and reintroducing a major portion of said removed washing liquid substantially free of said treating reagent at a generally centrally positioned location within the colmun adjacent the lower end of said pulping zone.

References Cited

UNITED STATES PATENTS

| 3,061,007 | 10/1962 | Rich | 162—237 |
| 3,362,868 | 1/1968 | Backlund | 162—237 X |
| 3,243,341 | 3/1966 | Lang | 162—237 |

S. LEON BASHORE, Primary Examiner

R. D. BAJEFSKY, Assistant Examiner

U.S. Cl. X.R.

162—251, 248, 239, 237, 60, 42

UNITED STATES PATENT OFFICE
CERTIFICATE OF CORRECTION

Patent No. 3,467,573     Dated September 16, 1969

Inventor(s) Karl E. Vogel

It is certified that error appears in the above-identified patent and that said Letters Patent are hereby corrected as shown below:

Column 4, line 31 "as" should read --a--; "washer" should read --washing--;
" " line 62, "below" has been misspelled;
" ", claim 1, line 68, after "chips" insert --by maintaining a compacted mass of said wood chips within an elongated pulping zone in the central portion thereof--.

SIGNED AND SEALED

DEC 9 - 1969

(SEAL)
Attest:

Edward M. Fletcher, Jr.
Attesting Officer

WILLIAM E. SCHUYLER, JR.
Commissioner of Patents